(Model.)
J. J. WHITE.
Machine for Cutting Files or Rasps.
No. 241,839. Patented May 24, 1881.
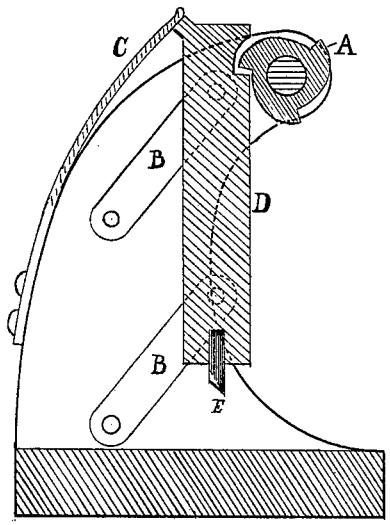
Fig. 1.
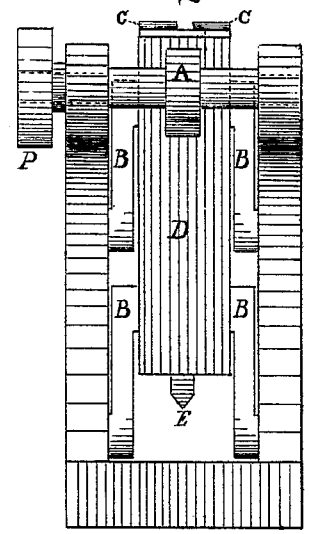
Fig. II.
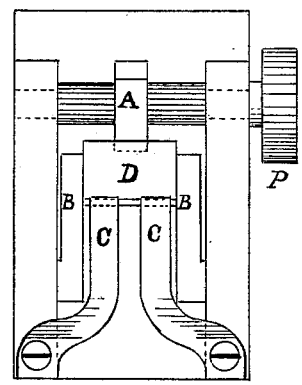
Fig. III.
Witnesses:
E. F. Burns.
D. H. Aaronson.
Inventor:
J. J. White.

UNITED STATES PATENT OFFICE.

JOSEPH J. WHITE, OF SMITHVILLE, NEW JERSEY.

MACHINE FOR CUTTING FILES OR RASPS.

SPECIFICATION forming part of Letters Patent No. 241,839, dated May 24, 1881.

Application filed July 9, 1880. (Model.)

*To all whom it may concern:*

Be it known that I, JOSEPH J. WHITE, of Smithville, in the county of Burlington and State of New Jersey, have invented a new and useful Improvement in File and Rasp Cutting Machines, of which the following is a specification.

My invention relates more especially to rasp-cutting machines, in connection with which a suitable table and feed-works for carrying the blank may be arranged.

The object of my invention is to give the chisel a movement similar to that given by a workman while hand-cutting. This movement consists in throwing the chisel forward at each downward stroke and causing it to recede as it is drawn back or up.

It also consists in giving the chisel a sharp, quick, cutting-stroke by means of a spring, and in lifting the chisel or chisel-holder by means of a cam.

Heretofore efforts have been made to accomplish similar results by using cams for producing the downward thrust of the chisel; but they have failed, as a blow is essential for throwing up a sharp cutting-edge on the file or rasp tooth; and at the present time rasps are cut by hand, as no machine has been produced capable of competing with the old method.

I attain the desired objects by the mechanism illustrated in the accompanying drawings, in which—

Figure I is a vertical section through the center of the machine. Fig. II is a front elevation, and Fig. III is a plan.

Similar letters refer to like parts throughout the several views.

The tool or chisel E is secured in a tool-holder, D, which is supported and guided by links B B pivoted to the frame, and also to the tool-holder D, in such a manner as to throw the chisel forward as it is brought down, the amount of forward thrust being regulated by the position of the links. Two links are sufficient to accomplish the desired result, or four may be used, as shown.

The chisel is lifted by means of the cam A, and thrown down by means of a spring, C. The cam is driven by power applied to the pulley P, or by any other suitable means. The file or rasp blank may be passed under the chisel in any convenient manner.

The operation of the device is as follows, viz: Power is applied to the pulley P, thus causing the cam A to lift the tool-holder D in the manner described, and the latter, upon being released by the cam, is quickly and forcibly driven down by means of a spring, which may be composed of rubber, steel, or any other suitable material. For cutting rasps several chisels may be used, instead of the single one shown.

Having thus described my invention, what I claim is—

In a machine for cutting files or rasps, the combination and arrangement, in relation to one another and to the frame of the machine, of the tool-holder D, links B, cam A, and spring C, substantially as and for the purpose described.

JOSEPH J. WHITE.

Witnesses:
E. F. BURNS,
D. H. AARONSON.